Figure 1:
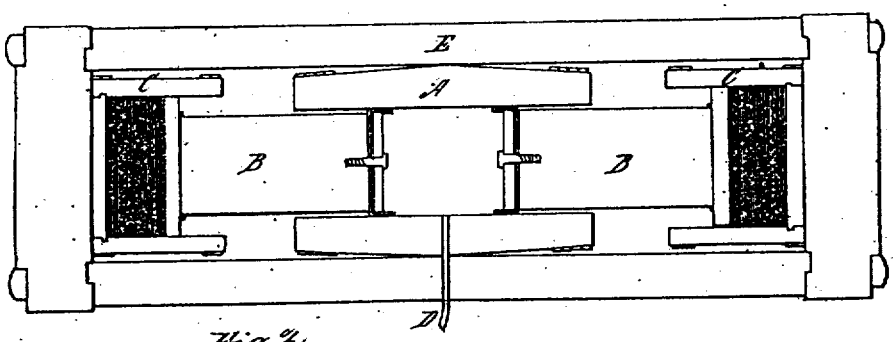
Figure 2:
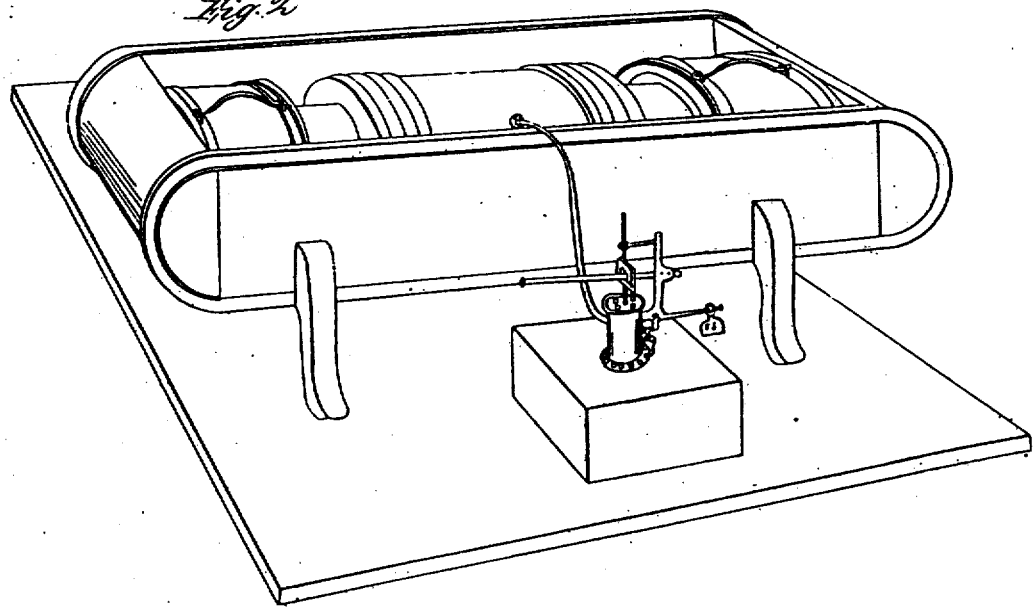

7196½X

Badger & Lull,

Hydraulic Press,

Patented Aug. 9, 1832.

NO PRINTED COPY OF SPECIFICATION IN OFFICE.

TEMPORARY NOTICE of BEST AVAILABLE IMAGE

U. S. PATENT AND TRADEMARK OFFICE

---

THE SCANNED IMAGES OF PATENT NUMBER 7196 1/2 X FOR THE ISSUE DATE OF 8 / 9 / 1832 ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

---

TEMPORARY NOTICE of BEST AVAILABLE IMAGE